Figure 1:
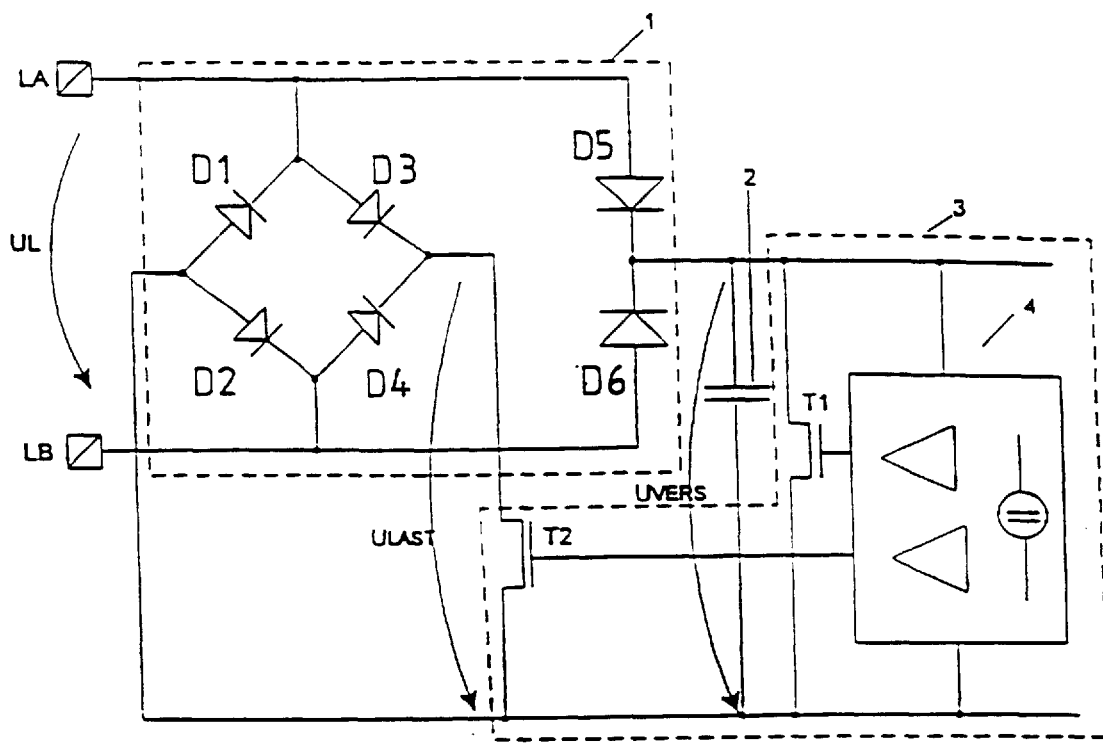

United States Patent
Holweg et al.

Patent Number: 5,874,829
Date of Patent: Feb. 23, 1999

[54] SUPPLY VOLTAGE PROCESSING CIRCUIT AND A DATA CARRIER WITH A SUPPLY VOLTAGE PROCESSING UNIT

[75] Inventors: Gerald Holweg; Manfred Koller; Peter Thüringer, all of Graz, Austria

[73] Assignee: U.S. Philips Corporation, New York, N.Y.

[21] Appl. No.: 776,419
[22] PCT Filed: Dec. 5, 1996
[86] PCT No.: PCT/IB96/00517
§ 371 Date: Jun. 24, 1997
§ 102(e) Date: Jun. 24, 1997
[87] PCT Pub. No.: WO96/38805
PCT Pub. Date: Dec. 6, 1996

[30] Foreign Application Priority Data
May 31, 1995 [AT] Austria ................................. A918/95

[51] Int. Cl.[6] .................................................. G05F 1/56
[52] U.S. Cl. .......................... 323/274; 323/281; 363/46
[58] Field of Search ................................ 363/44, 45, 46, 363/76, 77, 127, 39; 323/223, 224, 225, 281, 274; 340/870.39; 307/104; 455/117, 127, 573, 462

[56] References Cited

U.S. PATENT DOCUMENTS

| | | | |
|---|---|---|---|
| 5,045,770 | 9/1991 | Brooks | 323/223 |
| 5,202,838 | 4/1993 | Noue | 364/480 |
| 5,262,712 | 11/1993 | Klotzig et al. | 323/224 |
| 5,726,875 | 3/1998 | Hirabayashi et al. | 323/274 |

*Primary Examiner*—Peter S. Wong
*Assistant Examiner*—Y. J. Han

[57] ABSTRACT

Two parallel regulator stages, each comprising a transistor (T1, T2, respectively), are provided. The transistor (T2) forms part of the indirect parallel regulator stage and acts directly on the rectifier. It is capable of taking up comparatively large currents and hence is comparatively slow. The transistor (T1) forms part of the direct regulator stage and operates in parallel with the sustaining capacitor. Because of the coarse control provided by the transistor (T2), it need take up small currents only and can hence have a very fast control behavior. Because of the coarse control by the transistor (T2), the alternating voltage on the antenna terminals (LA and LB) quickly breaks down when the RF signal is interrupted; consequently, the transmission rate can be increased in the case of pause interval modulation. Static discharges are also dissipated by the transistor (T2), so that no additional protective circuitry is required for this purpose.

2 Claims, 1 Drawing Sheet

SUPPLY VOLTAGE PROCESSING CIRCUIT AND A DATA CARRIER WITH A SUPPLY VOLTAGE PROCESSING UNIT

The present invention relates to a supply voltage regulating circuit, which is intended notably for contactless, passive, inductive data carriers and includes a rectifier, a sustaining capacitor and a direct parallel regulator stage which is connected parallel to the sustaining capacitor; the invention also relates to a contactless, passive, inductive data carrier with an antenna and a supply voltage regulating circuit.

Data transmission systems for the transmission of data between a normally stationary write/read station and a plurality of data carriers are known. The data carriers serve as intelligent, mobile data stores which are used for the writing or reading of data in the near field of write/read stations. Such systems are used with a wide variety of transmission ranges, data transmission speeds, degrees of integration, storage capacities and levels of intelligence of the data carriers etc. for a wide variety of applications such as access control, industrial and commercial object identification, inhibition of ignition, automatic logbook checking etc. A further example in this respect is automatic payment of toll when a vehicle-installed data carrier passes a write/read station of a toll station.

There are data transmission systems with active data carriers (having their own power source), but also data transmission systems with passive data carriers which are powered inductively by an RF signal from the write/read station. After appropriate division, the frequency of the RF signals can be used as the clock signal, so that it is not necessary to transmit an own clock signal. For the transmission of data from the write/read station to the data carrier it is possible to interrupt the RF signal for very brief periods of time: Whether a "0" or a "1" is transmitted is then dependent on the interval between the interruptions; this can be readily determined by the data carrier by counting the clock pulses between two interruptions. The transmission of data from the data carrier to the write/read station can take place by load modulation of the RF signal transmitted by the write/read station. Using only a single signal, it is thus possible to transmit power as well as clock signals from the write/read station to the data carrier and to transmit information in both directions. This system is disclosed in Austrian Patent 395 224.

When a conventional supply voltage regulating circuit, comprising a rectifier, a sustaining capacitor and a direct parallel regulator stage (for example, in the form of a zener diode) connected parallel to the sustaining capacitor, is used for powering the data carrier, the problem is encountered that comparatively long interruptions of the RF signal are required so as to ensure reliable recognition of the interruptions by the data carrier. As has been found in the context of the present invention, such long interruptions are necessary because of the fact that when the RF signal is interrupted, the power supply for the data carrier is provided exclusively by the sustaining capacitor; consequently, the antenna coil is not loaded in any way so that it continues to oscillate for a prolonged period of time because of resonance phenomena. It is a further drawback that the parallel regulator stage must take up comparatively large currents when the data carrier is fed past the write/read station at a very short distance therefrom. Therefore, its regulating speed inherently is comparatively low, so that the voltage regulation is not satisfactory.

It is an object of the present invention to avoid the described drawbacks and to provide a data carrier which is also capable of detecting very short interruptions of the RF signal, so that the speed of transmission of data from the read/write station to the data carrier can be increased. It is another object of the invention to provide a supply voltage regulating circuit which delivers a better stabilized supply voltage. Furthermore, the reliability of the data carrier should be enhanced, notably its insusceptibility to static charges.

According to the invention these objects are achieved by means of a supply voltage regulating circuit of the kind set forth in which there is additionally provided an indirect parallel regulator stage which is decoupled from the direct parallel regulator stage and has a higher current loadability, and hence a slower regulating behavior, than the direct parallel regulator stages. According to the invention these objects are also achieved by a data carrier of the kind set forth with a supply voltage regulating circuit constructed as described above. No additional overvoltage protection circuit is connected to the antenna terminals.

In the construction of the data carrier according to the invention, or of its power supply voltage regulating circuit, a further, indirect parallel regulator stage is provided which is decoupled from the direct parallel regulator stage and acts, for example directly on the rectifier. The indirect parallel regulator stage serves for coarse control; it can take up large currents but is comparatively slow as a result, i.e. its regulating speed is low. Because coarse control is thus provided already by the indirect regulator stage, the direct regulator stage need take up comparatively small currents only, so that it may have a correspondingly higher regulating speed; very good regulation of the supply voltage is thus achieved. A further advantage of the indirect regulator stage consists in that it loads the antenna coil also during the interruptions of the RF signal so that the oscillations thereof are strongly damped and hence very brief interruptions can also be reliably detected. It is a further advantage of the indirect regulator stage that it can be constructed for very large currents, because a fast regulating behavior is not required and even undesirable, so that it can also readily dissipate static charges. Without further protective measures being required, the data carrier is thus made highly insensitive to the dissipation of electrostatic discharges, i.e. very thorough ESD (electrostatic discharge) protection is ensured. It is particularly advantageous that the circuit according to the invention is suitable for complete, very surface-efficient, monolithic integration.

Figure 2:
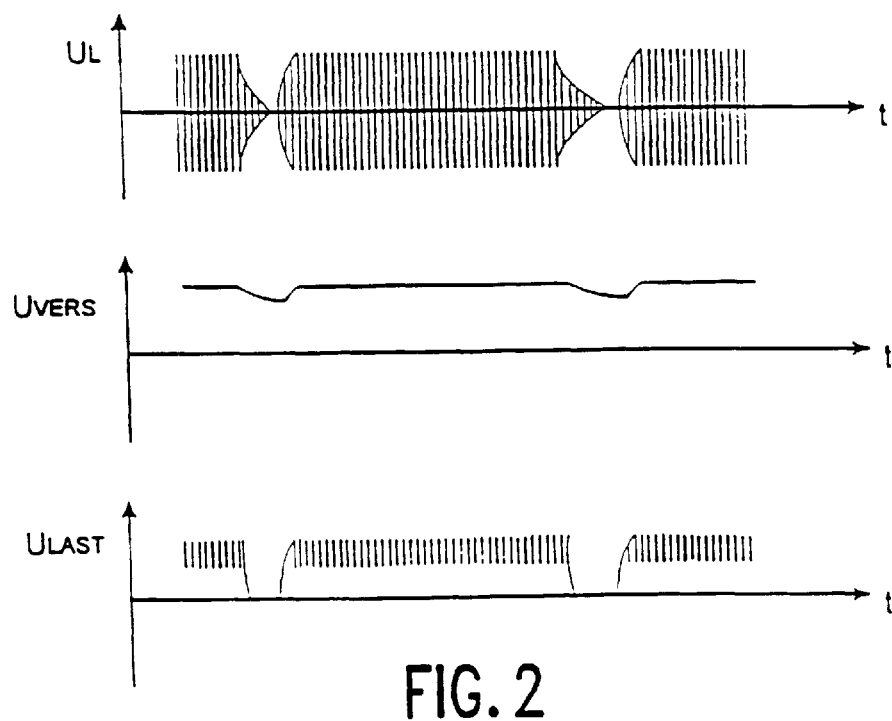

The invention will be described in detail hereinafter with reference to the drawing. Therein:

FIG. 1 shows the circuit diagram of a data carrier according to the invention, and FIG. 2 shows the variation in time of voltages at given points within the circuit of the data carrier shown in FIG. 1.

FIG. 1 shows the circuit diagram of the supply voltage regulating circuit. A coil is connected to the terminals LA and LB. The RF signal received by this coil is applied to the supply voltage regulating circuit. This circuit consists of a rectifier network 1 (diodes D1–D6) which is preferably implemented by means of MOS transistors and forms two mutually decoupled, rectified voltages $U_{last}$ and $U_{vers}$ from the alternating voltage $U_L$ applied, and also of a sustaining capacitor 2 for smoothing the actual supply voltage $U_{vers}$ and a voltage regulating circuit 3. The voltage regulating circuit 3 consists of two parallel regulators, each of which includes a respective transistor driver T1, T2 and a regulation amplifier stage with a reference voltage 4. Both regulator stages operate according to the parallel regulation principle, i.e. the driver transistors are activated as soon as the supply voltage $U_{VERS}$ exceeds a permissible value which is derived from the reference voltage. When the driver transistors are activated, current is drawn from the supply circuit so that the supply voltage is attenuated to a permissible value. The first regulator circuit, including the driver stage T1, has a fast regulating characteristic so that it can very quickly eliminate variations of the alternating voltage amplitude. In conjunction with the sustaining capacitor 2 a very constant supply voltage $U_{VERS}$ is thus obtained even in the case of fast amplitude variations of the antenna alternating voltage $U_L$ (see FIG. 2). However, for reasons of speed the driver transistor T1 must be small and hence not very powerful, so that it cannot dissipate large currents when large amounts of energy are coupled in. This task is performed by the second regulator stage which includes the driver transistor T2. Because of the size and high driving power of the transistor T2, the behavior of the second regulator is rather slow. T2 does not act directly on the supply voltage $U_{VERS}$; it attenuates this voltage only indirectly by attenuation of the alternating voltage amplitude via an own diode network for the load voltage $U_{LAST}$. Because of the inertia of the second regulator, the load voltage $U_{LAST}$ is subject to very strong fluctuations and usually breaks down completely (see FIG. 2) during the energy pauses; moreover, the antenna alternating voltage $U_L$ is strongly damped during the energy pauses, leading to fast extinction of the oscillations of $U_L$ during the energy pauses (see also FIG. 2), which itself results in fast pause recognition and hence a high data transmission rate from the write/read station to the data carrier. However, the supply voltage $U_{VERS}$ drops only insignificantly during the energy pauses (see FIG. 2 again). The voltage limiting behavior of the two parallel regulator stages also has a direct limiting effect on the input voltage $U_L$ on the antenna connection pads LA and LB of the chip. A very good overvoltage protection (ESD compatibility) is thus achieved on the antenna connection pads, so that no additional protective circuitry is required.

The described supply voltage regulating circuit combines a number of essential features which are notably useful for contactless data carrier systems, for example high ESD protection, high data transmission rate for pause interval modulation, and suitability for complete, surface-efficient monolithic integration.

We claim:

1. A supply voltage regulating circuit which is intended notably for contactless, passive, inductive data carriers and includes a rectifier, a sustaining capacitor and a direct parallel regulator stage which is connected parallel to the sustaining capacitor, characterized in that there is additionally provided an indirect parallel regulator stage (transistor T2) which is decoupled (diodes D3, D4 and D5, D6) from the direct parallel regulator stage (transistor T1) and has a higher current loadability, and hence a slower regulating behavior, than the direct parallel regulator stage (transistor T1).

2. A contactless, passive, inductive data carrier with an antenna and a supply voltage regulating circuit, characterized in that the supply voltage regulating circuit is constructed as disclosed in claim 1.

* * * * *